(12) United States Patent
Pollak (10) Patent No.: US 11,006,005 B2
(45) Date of Patent: *May 11, 2021

(54) METHODS, SYSTEMS AND APPLICATIONS FOR MANAGING WIRELESS SERVICES ON A WIRELESS DEVICE

(71) Applicant: TracFone Wireless, Inc., Miami, FL (US)

(72) Inventor: Frederick J. Pollak, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,953

(22) Filed: Jun. 23, 2020

(65) Prior Publication Data
US 2020/0322485 A1 Oct. 8, 2020

Related U.S. Application Data

(63) Continuation of application No. 16/573,038, filed on Sep. 17, 2019, now Pat. No. 10,694,047, which is a continuation of application No. 14/942,121, filed on Nov. 16, 2015, now Pat. No. 10,419,621.

(60) Provisional application No. 62/079,824, filed on Nov. 14, 2014.

(51) Int. Cl.
| H04M 15/00 | (2006.01) |
| H04W 4/24 | (2018.01) |
| H04M 15/28 | (2006.01) |
| H04M 15/02 | (2006.01) |

(52) U.S. Cl.
CPC ......... *H04M 15/852* (2013.01); *H04M 15/28* (2013.01); *H04M 15/83* (2013.01); *H04M 15/84* (2013.01); *H04M 15/85* (2013.01); *H04M 15/853* (2013.01); *H04M 15/854* (2013.01); *H04M 15/88* (2013.01); *H04M 15/888* (2013.01); *H04W 4/24* (2013.01)

(58) Field of Classification Search
CPC ....... H04W 4/24; H04M 15/00; H04M 15/58; H04M 15/83; H04M 15/85; H04M 15/84; H04M 15/88; H04M 15/80; H04M 15/852; H04M 15/853; H04M 15/854; H04L 12/1417; H04L 12/14
See application file for complete search history.

(56) References Cited

U.S. PATENT DOCUMENTS

| 2002/0151293 A1 | 10/2002 | Tysor |
| 2010/0169910 A1 | 7/2010 | Collins et al. |
| 2011/0289200 A1 | 11/2011 | Patil et al. |
| 2012/0108200 A1 | 5/2012 | Rubin et al. |
| 2012/0155296 A1 | 6/2012 | Kashanian |
| 2013/0097203 A1 | 4/2013 | Bhattacharjee et al. |
| 2013/0132854 A1 | 5/2013 | Raleigh et al. |
| 2013/0149994 A1 | 6/2013 | Gaddam et al. |
| 2014/0029424 A1 | 1/2014 | Callard et al. |
| 2014/0301218 A1 | 10/2014 | Luo et al. |

*Primary Examiner* — Ernest G Tacsik
(74) *Attorney, Agent, or Firm* — BakerHostetler (57) ABSTRACT

The application is directed to a method and system for tracking and managing data usage on a wireless device. A graphical user interface is displayed on a wireless device for tracking and managing data usage over a predetermined time. A request is received via the graphical user interface to set an alert. The alert indicates when the data usage exceeds a predefined value. A determination is made whether the data usage exceeds the predefined value. Further, an alert is transmitted to the wireless device.

20 Claims, 6 Drawing Sheets

METHODS, SYSTEMS AND APPLICATIONS FOR MANAGING WIRELESS SERVICES ON A WIRELESS DEVICE

CROSS REFERENCE TO PRIOR APPLICATIONS

This application is a continuation of U.S. patent application Ser. No. 16/573,038, filed Sep. 17, 2019, now U.S. Pat. No. 10,694,047, issued Jun. 23, 2020, which is incorporated herein by reference in its entirety, which application is a continuation of U.S. patent application Ser. No. 14/942,121, filed Nov. 16, 2015, now U.S. Pat. No. 10,419,621, issued Sep. 17, 2019, which is incorporated herein by reference in its entirety, which application claims the benefit from U.S. Provisional Application No. 62/079,824 filed on Nov. 14, 2014, which is hereby incorporated by reference in its entirety for all purposes as if fully set forth herein.

BACKGROUND OF THE DISCLOSURE

1. Field of the Disclosure

This application generally relates to methods, systems, and software applications for managing wireless services on a wireless device. More particularly, this application relates to methods, systems, and software applications for managing data services on prepaid and provisioned wireless devices.

2. Related Art

A myriad of options exist in the marketplace for customers desiring wireless services such as data, talk and text messaging. To obtain these wireless services, customers generally have the option of entering into a post-paid service, e.g., contract for a period of time, or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. An MNO heavily relies on backend systems to address any provisional, billing, security and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data and number of minutes/text messages used.

The services provided by the MNOs and MVNOs result in different cellular metering models. Typically, switch-based metering of subscription wireless services are employed by MNOs and handset-based metering of subscription wireless services are employed by some MVNOs. In a switch based metering of subscription wireless services, a carrier switch, interface, or similar structure, typically resides in a MNO cloud and usually performs billing, provisioning, and maintenance of rates and charges for all subscribers in the carrier space.

In handset based metering of subscription services, the handset implements a secure model for metering, charging, and maintaining the subscription of wireless services. Namely, the handset maintains a software algorithm that typically meters and charges for each of the cellular subscriber's usage of voice minutes and text messages, and has some level of back-end control for provisioning and adding airtime (voice minutes and/or text messages) to the line. The handset based metering model is premised on the notion that usage metrics for the handset are not easily available to the MVNO operator from MNOs. Such information from MNOs also is considered unreliable.

The amount of data necessary to perform various activities, such as, for example, sending/receiving emails, downloading music, streaming live videos and general web surfing varies among individual subscribers. The need to access data may be critical at times in order for subscribers to communicate or resolve an urgent issue. Depending upon use, some subscribers with pre-paid data services may encounter problems if their data is depleted before the end of the service day or there is not enough data to perform the requested task due to available remaining data.

A need exists for subscribers to obtain improved real-time updates and statistics of their remaining data to better manage their usage over a period of time.

A need exists in the art for an innovative method, system and application for tracking data usage alone or in combination with airtime usage.

Another need exists in the art for a method, system and application to transmit data usage information to a user and/or wireless carrier employing various statistical metrics to better manage their remaining data over a period of time.

Yet another need exists in the art for a method, system and application for automatically or manually suspending data usage once a specific data limit has been reached, or to update the data limit once the specific threshold has been met.

A further need exists in the art for a method, system and application to enable users to manage and control which data service requests to process upon reaching a predetermined threshold limit.

Yet a further need exists in the art for a method, system and application for users to purchase data before or after a certain data threshold limit is met.

Yet even a further need exists in the art for a method, system and application to integrate with a wireless carrier's billing system to automatically reset the allowed data limits for a user on a pre-paid plan.

SUMMARY OF THE INVENTION

The foregoing needs are met, to a great extent, by the invention, with a process, system and application for managing wireless services, such as data services, on electronic devices, such as wireless devices.

One aspect of the invention includes a method for managing wireless service usage on a wireless device that includes tracking wireless service usage with an application executed by a processor in a wireless device for managing wireless service usage; setting an alert when the wireless service usage exceeds a predefined value; determining whether the wireless service usage exceeds the predefined value; and transmitting the alert by the processor of the wireless device when the wireless service usage exceeds the predefined value to at least one of the wireless device and a wireless carrier, wherein the wireless service includes at least one of wireless data service, wireless voice service, and wireless text message service.

Another aspect of the invention includes a wireless device configured to manage wireless service usage that includes a processor configured to track wireless service usage to manage wireless service usage; the processor further configured to set an alert when the wireless service usage exceeds a predefined value; the processor further configured to determine whether the wireless service usage exceeds the predefined value; and the processor further configured to transmit the alert when the wireless service usage exceeds the predefined value to at least one of the wireless device and a wireless carrier, where the wireless service comprises at least one of wireless data service, wireless voice service, and wireless text message service.

Yet another aspect of the invention includes a non-transitory computer readable storage medium storing computer-readable instructions executed on a processor of the wireless device for a software application for managing data service on the wireless device that includes instructions for tracking wireless service usage with an application executed by a processor in a wireless device for managing wireless service usage; instructions for setting an alert when the wireless service usage exceeds a predefined value; instructions for determining whether the wireless service usage exceeds the predefined value; and instructions for transmitting the alert by the processor of the wireless device when the wireless service usage exceeds the predefined value to at least one of the wireless device and a wireless carrier, wherein the wireless service comprises at least one of wireless data service, wireless voice service, and wireless text message service.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

DETAILED DESCRIPTION

In today's wireless device market, it is important to adequately equip a wireless carrier with the resources and tools to track and control data usage. It is additionally important to adequately equip a user with the resources and tools to track and control data usage. Not every user operates their wireless data service in the same manner. Some users may stream videos or play video games while others may check email and casually surf the web. With these varying needs, users may desire to know how much data they are consuming over a predetermined amount of time. Accordingly, users can more appropriately determine if they need to stop or cut back on data usage. For example, users may determine which functions utilize the most data and if such functions can be reserved until a Wi-Fi signal becomes available. In addition, the information allows users to gauge if additional data should be purchased.

One aspect of the invention is to employ novel ways for wireless carriers and/or users to track data usage alone or in combination with airtime usage for talk and text.

Another aspect of the invention is to transmit data usage content to a user employing various statistical metrics so that the user can manage their data over a predetermined amount of time.

Yet another aspect of the invention is to automatically or manually suspend all or some data usage once a predetermined data threshold limit has been met.

A further aspect of the invention to control what kinds of data services are accessible upon reaching a predetermined threshold limit.

Yet even a further aspect of the invention is to provide a way to purchase data before or after a data threshold limit is met.

Yet even a further aspect of the invention is to integrate a wireless carrier's billing system with the system of a MVNO for purposes of automatically resetting the allowed data limits for a subscriber on a pre-paid plan.

Reference in this specification to "one aspect," "an aspect," "one or more aspects," or the like means that a particular feature, structure, or characteristic described in connection with the aspect is included in at least one aspect of the disclosure. The appearances of, for example, the phrases "an aspect" in various places in the specification are not necessarily all referring to the same aspect, nor are separate or alternative aspects mutually exclusive of other aspects. Moreover, various features are described which may be exhibited by some aspects and not by others.

Similarly, various requirements are described which may be requirements for some aspects but not by other aspects.

In aspects including a "wireless network", the network may encompass any type of wireless network including a network from which a Mobile Virtual Network Operator (MVNO) contracts with a Mobile Network Operator (MNO) wireless carrier to provide mobile phone services through the use of an electronic device, such as a Global System for Mobile Communication (GSM) network, Code-Division Multiple Access (CDMA) network, LTE network, 5G, EV-DO network, a network utilizing a communication channel as defined herein, or the like, that may utilize the teachings of the present application to allow a wireless device to connect to a wireless network.

It is to be understood that the system modules and method steps described in this application may be employed in various forms of hardware, software, firmware, special purpose processors or a combination thereof. The application preferably is directed to a process and system utilizing a software application including executable code that is operably stored on one or more program storage devices including but not limited to a magnetic floppy disk, RAM, ROM, CD ROM, SIM, UICC, cloud-based memory, Flash memory and/or the like.

In one aspect of the invention, there is described a method for tracking and managing data usage on a wireless device. Reference in this specification to a wireless device is intended to encompass devices such as mobile phones, mobile equipment, mobile stations, user equipment, cellular phones, smartphones, handsets or the like, e.g., Apple iPhone, iPad, Google Android based devices, BlackBerry based devices, other types of PDAs or smartphones, wireless dongles, or other mobile computing devices. The term "wireless device" may be interchangeably used and referred to herein as wireless handset, handset, mobile device, device, mobile phones, mobile equipment, mobile station, user equipment, cellular phone, smartphones, or phone.

Figure 1:
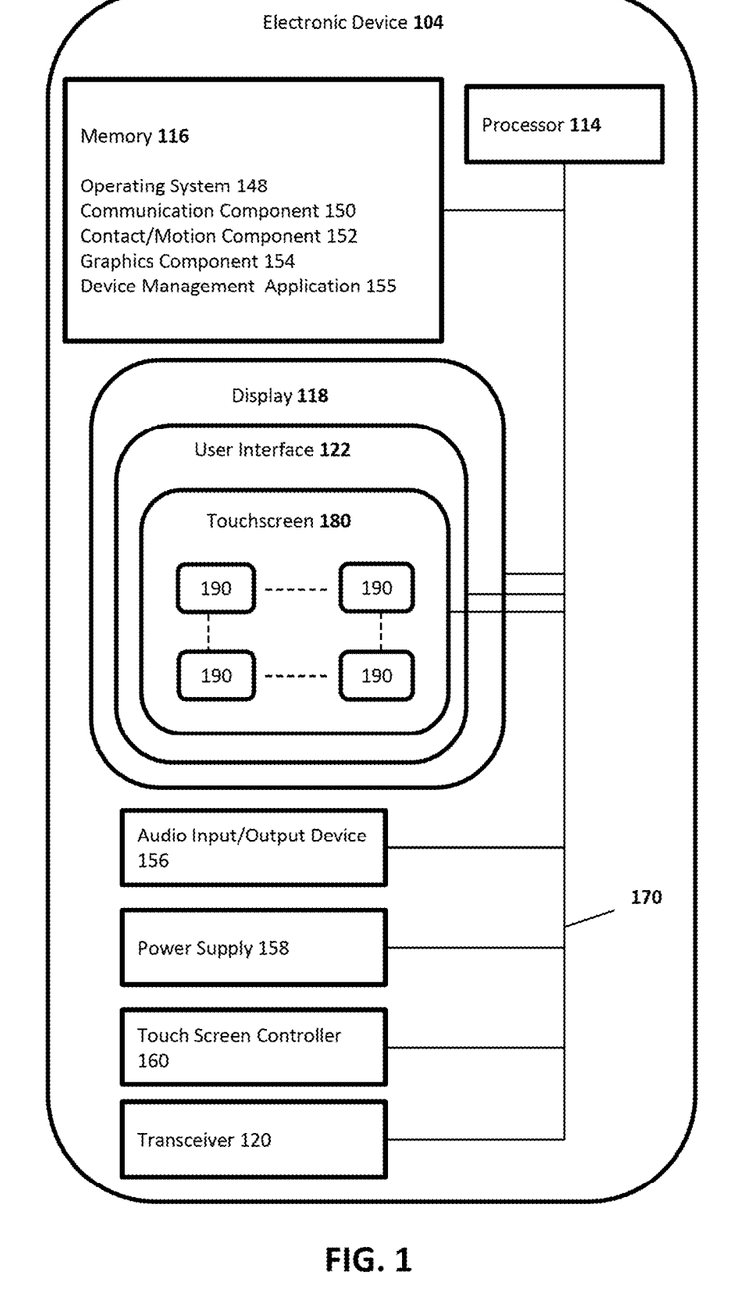
FIG. 1 illustrates an exemplary wireless device in accordance with an aspect of the invention.

FIG. 1 illustrates an exemplary aspect of a wireless device 104, such as, for example, a mobile smart phone which may be employed in many aspects of this application. In an exemplary aspect, the wireless device 104 includes a processor 114, memory 116, display 118 and user interface 122.

The processor 114 may be a central processing unit configured to execute instructions, such as, for example, instructions related to software programs. Any processor can be used for the electronic device as understood to those of ordinary skill in the art. The display 118 may be a liquid crystal display (LCD). Preferably the LCD includes a backlight to illuminate the various color liquid crystals to provide a more colorful display. The user interface 122 may be any type of physical input as readily employed in the field. For example, the user interface 122 may have physical buttons. Alternatively, the user interface 122 may be implemented on a touchscreen 180.

The memory 116 of the wireless device 104 may further include an operating system 148, a communication component 150, a contact/motion component 152, a graphics component 154 and the like. The operating system 148 together with the various components provides software functionality for each of the components of the wireless device 104. The memory 116 may include a high-speed, random-access memory. Also, the memory 116 may be a non-volatile memory, such as magnetic fixed disk storage, SIM, U ICC, cloud-based memory, flash memory or the like. These various components may be connected through various communication lines including a data bus 170.

The wireless device 104 may include an audio input/output device 156. The audio input/output device 156 may include speakers, speaker outputs, and the like, providing sound output; and may include microphones, microphone inputs, and the like, for receiving sound inputs. In an exemplary aspect, the audio input/output device 156 may include an analog to digital converter and a digital to audio converter for audio input and output functions respectively. The wireless device 104 may further include a power supply 158.

In another aspect, the wireless device 104 may include a transceiver 120. The wireless device 104 may provide radio and signal processing as needed to access a wireless network for services. The processor 114 may be configured to process call functions, data transfer, and the like and provide other services to the user.

In an exemplary aspect, the touchscreen 180 of the invention may be implemented in the display 118 and may detect a presence and location of a touch of a user within the display area. For example, touching the display 118 of the wireless device 104 with a finger or hand. The touchscreen 180 may also sense other passive objects, such as a stylus. The touchscreen 180 may further include a touch screen controller 160.

In operation, the display 118 may show various objects 190 associated with applications for execution by the processor 114. For example, a user may touch the display 118, particularly the touchscreen 180, to interact with the objects 190. That is, touching an object 190 may execute an application in the processor 114 associated with the object 190 that is stored in memory 116. Additionally or alternatively, touching an object 190 may open a menu of options to be selected by the user. The display 118 may include a plurality of objects 190 for the user to interact with. Moreover the display 118 may include a plurality of screens. The display 118 showing one screen at a time. The user may interact with the display 118 to move a screen into view on the display 118. Various objects 190 may be located in each of the screens.

The touchscreen 180 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The display 118 is generally configured to display a graphical user interface (GUI) 122 that provides an easy to use visual interface between a user of the wireless device 104 and the operating system or application(s) running on the wireless device 104. Generally, the GUI presents programs, files and operational options with graphical images. During operation, the user may select and activate various graphical images displayed on the display 118 in order to initiate functions and tasks associated therewith.

In another aspect of the invention, the memory 116 of a wireless device 104 includes a database for storing user information. The user information may include information such as full name, address, email address, contact number, credit card information, and the like. In one aspect, the database may include security questions. In another aspect, the database may include user specified preferences.

In yet another aspect of the application, the memory 116 of a wireless device 104 includes a data management application 155. The data management application 155 may be configured to control use of the wireless device 104 based on interaction with a server, the server provisioning wireless service to the user, or the like. The data management application 155 may utilize an internal accounting module to establish an account with a representation of prepaid funds or available credit for wireless services. The internal accounting module may also store a plurality of charge rates and may also store a billing algorithm. The internal accounting module can classify each wireless service (data, voice, SMS) into one of a plurality of billing categories; select a charge rate corresponding to that billing category; calculate an appropriate charge for the data usage, voice usage, and SMS usage in real time by using the selected charge rate; and apply this appropriate charge to the account. Once the internal accounting module determines that the amount of wireless service (data, voice, SMS) used has depleted the account zero, the internal accounting module may interact with the processor 114 to limit, prevent, or control further use of the wireless device 104 as described herein. The controlled use including suspending voice calls, allowing limited voice calls, allowing all voice calls, suspending text messages, allowing limited text messages, allowing all text messages, suspending wireless data service, limiting wireless data service, throttling wireless data service, and allowing all wireless data service. In this aspect, the data management application 155 may also include a module for one or more system provider host processors, which store wireless device identification information; store operating codes needed for wireless device activation; and store operating codes needed for setting prepaid funds or available credit amounts in wireless device accounts whereby, upon receipt of wireless device identification information from a particular wireless device or its user, the host processor may be capable of ascertaining the operating codes needed to activate that particular wireless device or needed to set its account amount. Further details of this aspect of the data management application 155 are described in U.S. Pat. No. 6,650,887, to McGregor, et al., filed Nov. 18, 2003 and incorporated by reference herein in its entirety.

Alternatively, the data management application 155 may be implemented in conjunction with a metering client that may be implemented as a process capable of tracking usage of a wireless device in a wireless network with a metering system implemented in a network operator cloud and a tracking system implemented in a wireless device. The metering client may be capable of activating the wireless device 104 in response to identification of the wireless device and confirmation of use of a tracking system to the metering system. The metering client may be further configured to obtain by the metering system, an amount of wireless services (data, voice, SMS) used by the wireless device; wherein the obtaining includes at least one of obtaining an amount of wireless services used from the third party wireless network and obtaining an amount of wireless services used from the tracking system. With this information, the data management application 155 can interact with the processor 114 to control use of wireless device 104. The controlled use including suspending voice calls, allowing limited voice calls, allowing all voice calls, suspending text messages, allowing limited text messages, allowing all text messages, suspending wireless data service, limiting wireless data service, throttling wireless data service, and allowing all wireless data service. Further details of this aspect of the metering client are described in U.S. Pat. No. 8,805,323, filed Nov. 6, 2012 and incorporated by reference herein in its entirety. This data management application 155 also allows the user to manage settings and functions of various applications on their wireless device 104.

Figure 2:
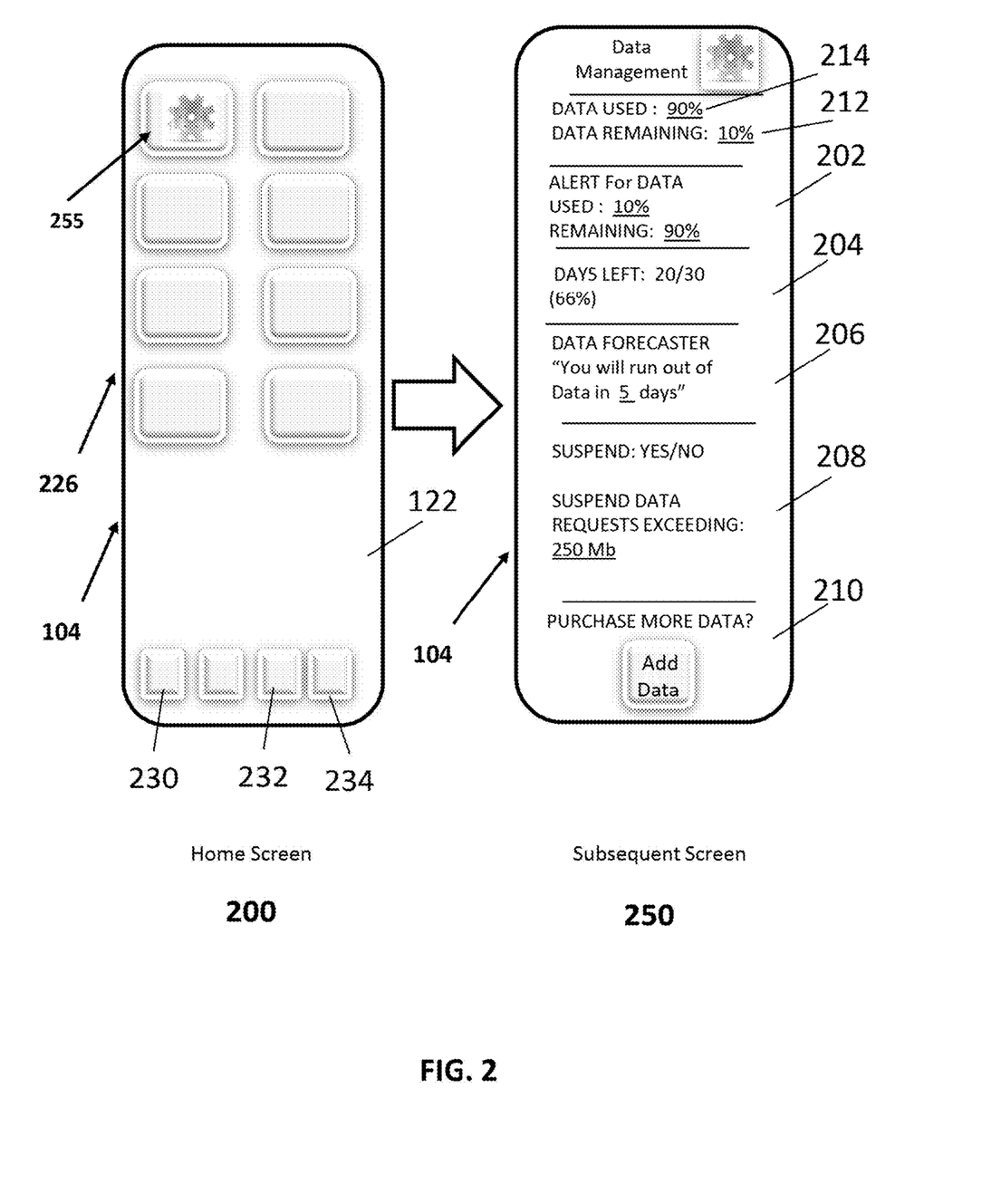
FIG. 2 illustrates an exemplary wireless device with a display of a home screen and a subsequent screen of a data management application with a graphical user interface for controlling data consumption and alerts in accordance with an aspect of the invention.

As illustrated in an exemplary aspect as shown in FIG. 2, there is a home screen 200 of a wireless device 104. The home screen 200 may include but is not limited to a calling icon 230, texting icon 232, Internet icon 234, and the like allowing a user to perform one or more functions on the wireless device 104. The home screen 200 may also display icons 226 for one or more applications that have been downloaded from the Internet, or retrieved from a store, such as, Google Play, Android Market, Apple store or the like. The user interface 122 of the wireless device 104 may display the data management application 155 as an icon 255 for tracking and managing data usage over a predetermined time. The application may come pre-installed on the wireless device. In some aspects, the data management application 155 may be downloaded and installed from an application portal, such as, for example, Google Play, Android Market, Apple store or the like. In some aspects, the data management application 155 may be pushed to the wireless device 104. In some aspects, data management application 155 may be stored in a robust manner that prevents a user from deleting, modifying, tampering, and the like. In this regard, the data management application 155 may include various levels of encryption and tamper prevention. As shown in FIG. 2, the data management application 155, after being downloaded, may appear on the Home Screen 200 as a shortcut. In an alternative aspect, the data management application 155 after being downloaded appears on a subsequent screen or in a folder along with plural other applications. In an alternative aspect, the data management application 155 after being downloaded may be hidden and run in the background.

In one aspect, the data management application 155 automatically starts upon recognition that the wireless device has been activated. The data management application 155 may seamlessly run in the background and utilizes very little battery life. In this aspect, the data management application 155 is factory installed and cannot be removed from the wireless device. In an alternative aspect, the data management application 155 can be configured such that it opens and becomes active only when the subscriber opens the application. In another aspect, the data management application 155 is configured such that that it can be removed from the wireless device. That is, if the user does not wish to maintain the data management application 155 on the wireless device, the user may execute the controller function and confirm that the data management application be deleted from the memory of the wireless device. During such a deletion of the data management application 155, the MVNO and/or MNO may be informed so the wireless carrier may suspend wireless service to the wireless device 104, may send a message to the wireless device 104 to install the data management application 155, or the like.

Additionally, the data management application 155 may send a periodic ping or message to the wireless carrier (MNO and/or MVNO) to indicate that the data management application is loaded on the wireless device 104. If the wireless carrier does not receive the periodic ping or message, the wireless carrier may suspend wireless service to the wireless device 104, may send a message to the wireless device 104 to install the data management application 155, or the like.

The data management application 155 for tracking and managing data usage is versatile and customizable according to the user's preferences. For example, as shown in the subsequent screen 250, the graphical user interface of the data management application 155 allows viewing and tracking remaining data 212, e.g., 10% remaining. Alternatively, the data used 214 thus far, e.g., 90% used, over a predetermined time period, may be accessed. This data may be obtained from the account module of the data management application 155.

In another aspect, the data management application 155 tracks data in combination with minutes used/remaining. In a further aspect, the data management application 155 tracks data in combination with SMS text messages used/remaining. In yet even a further aspect, the data management application 155 tracks data in combination with airtime minutes and SMS text messages used/remaining.

In another exemplary aspect, the predetermined time period can be based upon any finite period of time. For example, in one aspect, this period is based upon the number of paid service days. Paid service days are defined as the number of days for which a pre-paid service remains active before the user is required to purchase additional days. Service days can range anywhere from about 1 day to 2 years. The most common increments of service days include but are not limited to 30 days, 60 days, 90 days, 120 days, and 365 days. Additional service days may also be added. This may be appropriate, for example, when a user has a certain amount of data remaining but no more service days. The user can opt to purchase, via the data management application 155, additional service days. The tracking and purchase of service days may be overseen by the accounting module of the data management application 155. Should the predetermined time period expire, the data management application 155 in conjunction with the processor 114 may suspend or limit wireless service in the wireless device 104.

When the predetermined time is based upon a monthly pre-paid service, the user may be provided with data information 212, 214 with respect to the remaining days of the particular month. For example, January contains 31 days while February contains 28 days (and 29 days during a leap year). The number of days left 204 and a percentage of days left 204 may also be displayed.

The data management application 155 may also be configured to receive a request via the GUI or wirelessly by the wireless carrier to set an alert when the data usage exceeds a predefined value over the predetermined time 202. As shown in FIG. 2, the user is able to customize when 202 they wish to receive an alert regarding data used and/or remaining minutes. For example, the subsequent screen 250 indicates a value of 90% of data used 202 within the predetermined time period that may trigger an alert. That is, 10% of the data is remaining. While the value of 90% used is provided, this value is exemplary, and customizable to any value from 1-100% as desired by the user. In a preferred aspect, the value is 10%, 20%, 30%, 40%, 50%, 60%, 70%, 80% or 90%. More preferably, the value is 80% or greater. Additionally, the data management application 155 may also provide the alert to the wireless carrier so that the wireless carrier remains informed as to the usage of wireless services by the user.

The data management application 155 also indicates the number of days remaining 204 in the predetermined time period. As illustrated, 20 of the 30 days have been used 204. Hence, 10 days remain. Providing the amount of days remaining in the predetermined period is extremely useful for users. Additionally, a percentage of days left may also be displayed. Namely, some users may be on track to use less than their allotted data before expiration of the predetermined time period. Accordingly, no further data would need to be purchased. Alternatively, the user may become aware that they require additional data before the end of the predetermined period and will therefore likely need to make a purchase.

The data management application 155 also includes a "DATA FORECASTER" 206. This tool is useful for the user to obtain an accurate assessment as to whether they will go over their allotted data within the predetermined period of time. That is, when a user receives an alert indicating 90% of the data has been used, they may become overly conservative in the manner in which they utilize wireless service. Sometimes, this worry is premature. If the user has 1 day remaining (3%) in the period of time with 90% of data used and 10% remaining, the user is unlikely to run out of data. On the other hand, if the user has 10 days remaining (33%) in the period of time with 90% of data used and 10% remaining, the user may wish to consider purchasing additional data for the predetermined period of time.

In another aspect, after the user sets an alert 202, the data management application 155 determines, either in real-time or at specific time intervals in the day, whether data usage has exceeded a predefined value over the predetermined time period. If the determination is made by the data management application 155 in real-time, the data management application 155 may review data usage of the instant wireless device and check against the user's or wireless carrier's predefined value. The data management application 155 also is capable of determining remaining days in the predetermined time period. Moreover, the data management application 155 is able to forecast when the wireless device may run out of data based upon past performance 206. The past performance may be based upon the predetermined period of time. Alternatively, the past performance may be based upon a set period, e.g., last 12 months, or all history on the wireless device 104. The past performance may also be customizable to a specific date range. This may be helpful for the user when it is apparent that heavy downloading and use of data transpired during a brief period of time which otherwise would skew the average data usage had the user adopted a more conservative approach.

Figure 3:
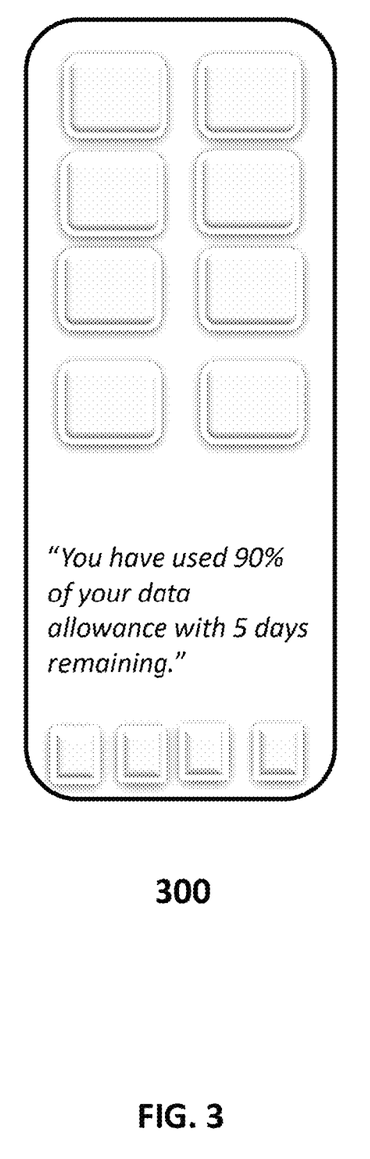
FIG. 3 illustrates an exemplary wireless device with a display providing an alert when data usage reaches a predetermined threshold in accordance with an aspect of the invention.

In a further aspect, as shown in FIG. 3, the application transmits an alert to a home or subsequent screen 300 of the wireless device when the data usage exceeds the predefined data value set at input 202 in screen 250. In an exemplary aspect, the message is sent in real-time to the wireless device 104. In an alternative aspect, the message is transmitted at one or more specific times in the day. The alert may be sent to the user via text message, a pop-up, instant message, email, or any other platform of communication readily known to those of ordinary skill in the field of wireless devices. For example, the alert may be sent by internally generated text message. Such an internal text message avoids wireless network usage costs and eliminates network congestion. For example, the alert shown in FIG. 3 may appear as a pop-up at the bottom of the home or subsequent screen 300 or may appear as a text message indicating "You have used 90% of your data allowance with 5 days remaining."

If, on the other hand, the determination is made by the application at a specific interval, such as, for example, once a day, the user may receive the alert with a time stamp of the exact date and time the data usage exceeded a predefined value.

In yet another aspect, after the alert is transmitted to the wireless device, the application is considered to be in ACTIVE mode. ACTIVE mode is defined as monitoring and tracking all future data requests and prompting the user to allow or deny each specific request. A data request is when a user of a wireless device employs wireless data to carry out a function such as e-mail or internet searching. For example, the user may be prompted with a pop-up to allow or deny a request. If desired, the user may customize the settings of the application to not appear or to appear in certain instances.

In yet even another aspect, after the alert is transmitted to the wireless device, the application may receive a request to suspend a data request exceeding a predefined data value 208 via the user interface 122. For example, the application may allow smaller data requests, such as, for example, email, while preventing larger data requests such as, for example, streaming videos. As illustrated in FIG. 2, the user is able to input a specific value 208 for suspending data requests via the graphical user interface. The MNO and/or MVNO may also utilize preset values for this implementation as well. The value may be selected anywhere from about 1 MB to a value less than the remaining amount of data for the predetermined period of time. For example, if the total paid-for data was 5 GB, and the remaining data was 4 GB, the user may input a value up to 3.99 GB. In an alternative aspect, a value may be selected from a predefined dropdown box, such as, for example, 100 MB, 250 MB, 500 MB, 750 MB, or 1 GB. In an exemplary aspect, the user may select via the graphical user interface of the application to suspend specific types of data, i.e., streaming videos or downloading large attachments, while allowing other types of data to pass i.e., e-mail and general web surfing after the alert. Likewise, the wireless carrier may suspend specific types of data, i.e., streaming videos or downloading large attachments, while allowing other types of data to pass i.e., e-mail and general web surfing after the alert utilizing the data management application 155.

In another aspect, the data management application 155 is configured to determine if the data request exceeds the specific value set by the MNO and/or MVNO. If the value does not exceed the specific value, the application will permit the data request to continue. If, on the other hand, the data request exceeds a specific value set by MNO and/or MVNO, the data management application 155 will hold the request in abeyance. In one aspect, the request is blocked. In another aspect, the data usage may be slowed or throttled. In an alternative aspect, the application sends a query to the user. The query may be in the form of a pop-up alert or text-message asking the user whether they wish to purchase additional wireless service.

In a further aspect, the user may wish to view a customized description of their individual consumption of data. As shown in FIG. 2, the application displays a 'DATA FORECASTER' 206. The forecast may be based upon a computation of data remaining through days remaining in the predetermined period. That is, the application computes the average data usage through the number of days in the predetermined period and forecasts future data usage. As discussed above, the predetermined period depends upon the number of service days purchased, i.e., 30, 60, 90 etc., or the number of days in the month for a monthly plan. The user will be better equipped at determining whether to permit future data requests, suspend all service, or purchase additional data. Accordingly, the user will be able to enjoy their data using experience without worrying about checking data consumption after each data request.

In yet another exemplary aspect, the user may set an alert via the graphical user interface when the data forecaster predicts less than "X" number of days remaining. For example, the user may set an alert at 5 days remaining. Once this threshold is met, the application sends a pop-up message, text message, e-mail or the like, depending upon user preferences, to alert the user of the remaining data. In an exemplary aspect, the alert is sent in real-time. In an alternative aspect, when power consumption is a priority, the alert is sent on a periodic basis, e.g., once a day. In another alternative aspect, the 'DATA FORECASTER' alert is triggered after transmission of the data threshold limit alert. That is, the 'DATA FORECASTER' alert is activated and sent only if the data threshold alert is sent to the user. For example, as shown in FIG. 2, if the threshold data alert is 90% and the user has exceeded this value, the 'DATA FORECASTER' alert will be activated and sent out if data will run out in 5 days. Additionally, the alert may only be sent when remaining days of data is less than remaining days of service.

In another aspect, the user may wish to take a more conservative approach to managing data consumption. For example, a manual request may be set via the graphical user interface to suspend all data over the predetermined period of time, e.g., service days paid for or days in a month. This may be done after either a data threshold alert or 'DATA FORECASTER' alert is transmitted. This may be important to employ in circumstances where the user is under a strict budget and still requires data through the duration of the predetermined period of time. Alternatively, the suspension of data may be automatic upon transmission of the alert.

In even a further aspect, the application may receive a request via a graphical user interface to set a new alert. As shown in FIG. 2, the user may change the alert at any time. However, the threshold data limit is changed upon receiving an alert from the application that the original data threshold has been exceeded. Accordingly, the alert will generally be at a higher value or percentage than previously set. For example, if the original alert was set at 90%, the next alert should at least be 91% or greater. The purpose of setting a new alert is to assist the user in managing data consumption. There may be many personal or professional reasons for this. For example, the user may be expecting to use a large amount of data in single or multiple occurrences after the initial alert has been received. The user may desire to know whether the single or multiple occurrences will exceed the next data threshold which has been set. For example, the second data threshold may be set at 95%, based upon the initial data threshold set at 90%. Accordingly, the user may be assured that some data remains for use in case of an emergency.

In even a further aspect, the data management application is configured to communicate with the carrier's billing system to ensure accurate information is available with respect to pricing terms and time remaining in the predetermined period. This is important when the user updates their data, service days or airtime other than through the data management software application. It is also important if there is a monthly service. Namely, the carrier (MNO and/or MVNO) communicates directly with the application, either in real-time or on a periodic basis. The communication between carrier and application allows values stored in the application to be recalibrated in view of purchased data/airtime or service days. Recalibration also occurs for monthly services to re-set the days of the month and/or the airtime/data under the monthly plan. Sometimes, the airtime/data from a previous month may be set by the wireless carrier to roll over to the next month.

Figure 4:
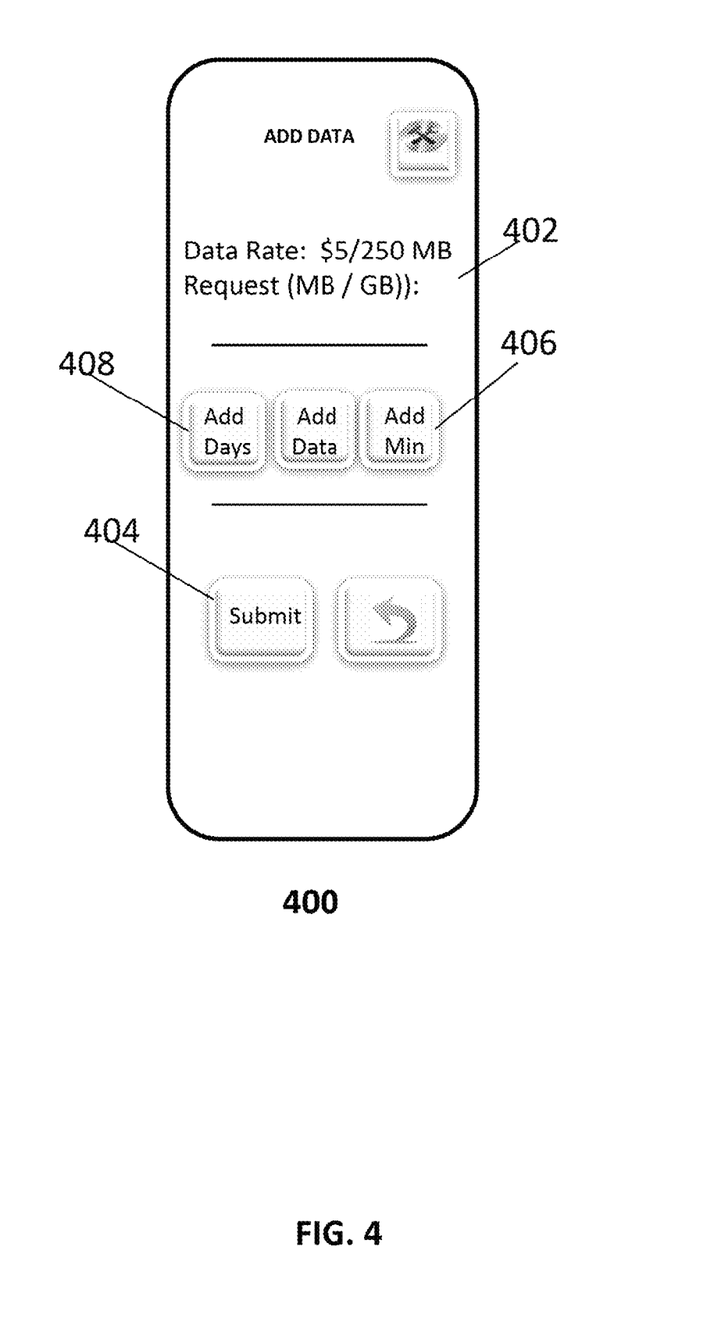
FIG. 4 illustrates an exemplary wireless device with a display of a subsequent screen with a graphical user interface of a data management application for purchasing additional services in accordance with an aspect of the invention.

In yet even a further aspect, the user may wish to purchase additional data after receiving the alert from the data management application 155. As shown in FIG. 2, the subsequent screen 250 includes a prompt 210 to purchase additional data. In an exemplary aspect, the subsequent screen transfers the user to a tertiary screen as shown in FIG. 4. As shown in FIG. 4, the data rate is provided for various set amounts, such as, for example, 250 MB, 500 MB, 1 GB and 2 GB. Alternatively, the user may be able to insert any data amount and pay a prorated price with or without a surcharge. For example, if the price for 250 MB is $5.00 but the user desires only 200 MB, the prorated price would be $4.00 plus any additional surcharge, if applicable. The user inputs the amount of data desired 402 on the graphical user interface and selects 'SUBMIT' 404. Thereafter, the accounting module of the data management application 155 may oversee the purchase of data and associated updating of information.

Also illustrated in FIG. 4 is the option to buy more airtime minutes 406 or add more days 408. As common among some pre-paid services, a wireless device must have either remaining service days or a monthly service. Even further, to use data services with some pre-paid services, the wireless device must have either remaining service days or a monthly service in addition to available airtime minutes. Providing all three options to the user in one convenient location improves user experience.

In yet a further exemplary aspect, the application is able to process and confirm whether the user has any funds available to process the request for additional data, air and/or service days. Namely, the application may check for credit or debit card information stored in the memory of the phone. Alternatively, the data management software application may be configured to access the user's records from the service provider via the network. For example, if the application concludes that the financial information is available and current, the data management application 155 may execute the purchase request received from the user via the graphical user interface. The accounting module of the data management application 155 may oversee and update information accordingly. The user will be able to use the purchased additional data or airtime instantaneously.

On the other hand, if the user does not have his or her credit/debit card information in the memory of the wireless device or on file, the application may prompt the user to enter the debit/credit information along with security information such as the billing address and any other information necessary to complete the transaction. Alternatively, the user may have a transaction code for minutes or data that was purchased online or from a retail outlet. This may be appropriate in instances where the user does not have a credit/debit card or wishes not to provide such information to the data management software application residing on the wireless device.

Figure 5:
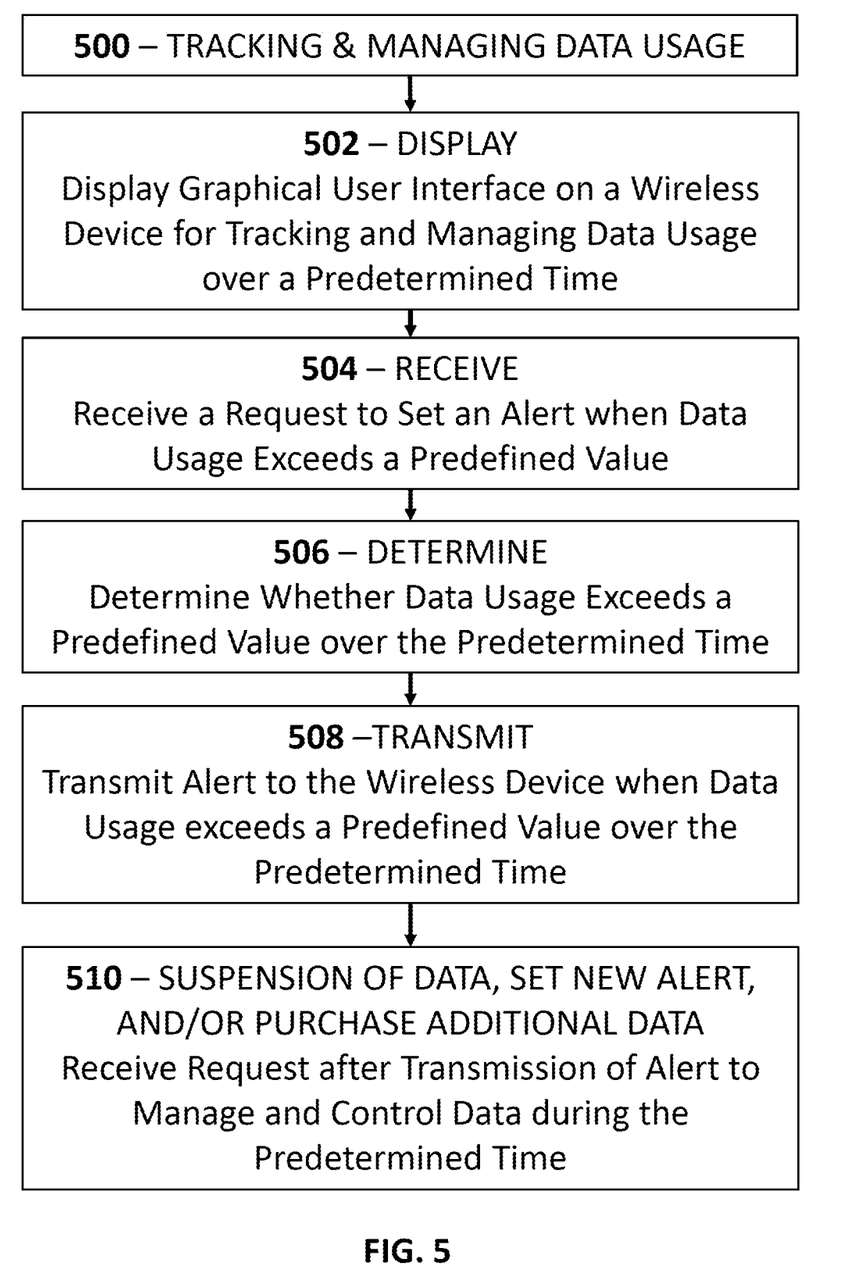
FIG. 5 illustrates a hierarchy chart for the data management application for tracking and managing data usage on a wireless device in accordance with an aspect of the invention.

FIG. 5 illustrates a flow diagram for tracking and managing data usage in a wireless device. The wireless device may employ pre-paid services. The services may be provided by a MVNO. Box 502 illustrates instructions for the application to display a graphical user interface on the wireless device. The application tracks and manages data used on the wireless device through the duration of the predetermined time. The predetermined time can be based upon the number of service days paid for in a pay-as-you-go plan or alternatively, the number of days in a month for a monthly service plan, e.g., varies based upon days in a specific month. The graphical user interface may include features, as will be discussed herein, to partially or fully suspend wireless data usage, throttle wireless data usage, set a new alert and/or purchase additional data.

Box 504 illustrates receiving a request via the graphical user interface to set an alert when the data used by a user over a predetermined time exceeds a predefined value. The predefined value input by the user identifies a threshold at which the user desires knowing in order to more effectively manage and use future data over the predetermined period. This value may alternatively or additionally be provided by the wireless carrier.

Box 506 illustrates the application determining whether data usage exceeds a predefined value over the predetermined time. Namely, the application resets the clock for monitoring at the end of the "predetermined time." This value may automatically be reset when the services are provided monthly. Alternatively, the time may be reset for pay-as-you-go wireless services upon purchasing and configuring the additional service days and/or additional minutes into the wireless device. In a further aspect, the predetermined time may be reset by the MVNO and/or MNO.

Box 508 illustrates instructions to transmit an alert to the wireless device when data usage exceeds a predefined value over the predetermined time. That is, the application sends a pop-up, text, emails or other mode of communication to a display of the wireless device so that the user can understand how much data remains or has been used over the predetermined period. The display also may show how many days remain for using the wireless device. The alert may also be transmitted to the wireless carrier.

Box 510 illustrates instructions received by the application through the graphical user interface of the wireless device to suspend data, set a new alert, and/or purchase additional data. The application includes features to partially or fully suspend data. This feature is customizable and allows a user to better manage his or her remaining data. The partial suspension may include but is not limited to thresholds or caps above which data is not sent. The graphical user interface also allows the user to set a new alert, at a higher value. The graphical user interface also provides the user with an option to purchase additional wireless data service, airtime or service days.

Figure 6:
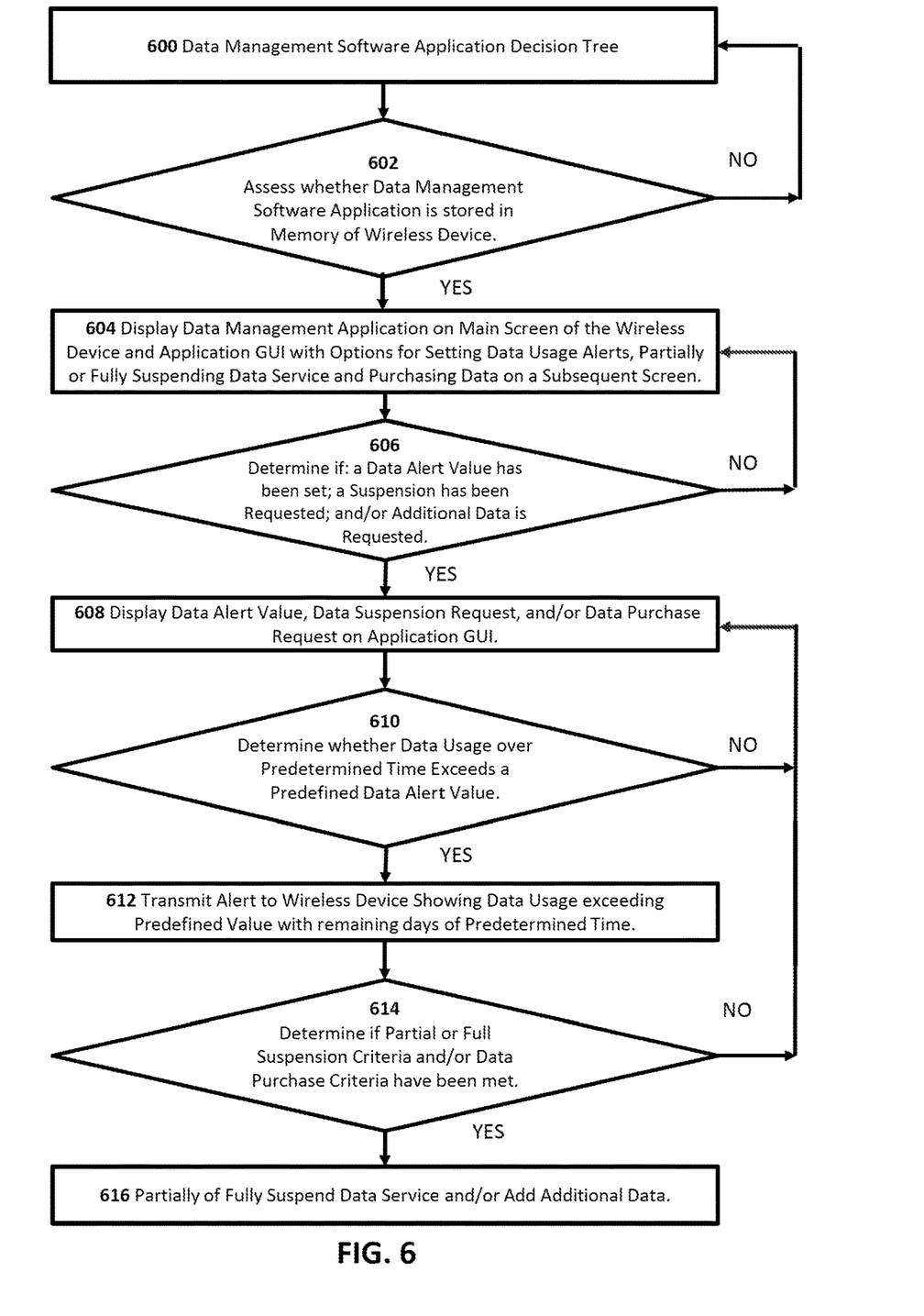
FIG. 6 illustrates a decision tree for the data management software application in accordance with an aspect of the invention.

FIG. 6 illustrates a decision tree 600 for the Data Management Application. The first decision Box 602 of the process assesses whether the application is stored in the memory of the wireless device. According to Box 602, if the software program concludes in the negative, the process is returned to Box 600. In this regard, if the data management application 155 is not resident and operating on the wireless device 104, a notification message may be sent to the MNO and/or MVNO. Thereafter, the MNO and/or MVNO can take action to discontinue wireless service to the wireless device 104 or some other action.

On the other hand, if the software application concludes in the affirmative, the Data Management Application may be displayed on a Main or Home screen of the wireless device along with other applications. The Data Management Application may either automatically execute upon recognition that the wireless device is powered on, or wait until a user manually executes the application. The Main or Home screen may include a shortcut for the Data Management Software Application. Alternatively the data management application may be located under the applications sub-menu. In an exemplary aspect, the subsequent screen directly follows the initial screen which displays the device management application.

After the application has been executed, a graphical user interface (GUI) may be displayed with options for setting data usage alerts, partially or fully suspending data service and purchasing additional data as shown in Box 604. The GUI may also provide the user with options to purchase additional airtime and service days. Additionally, the wireless carrier may be able to set data usage alerts, partially or fully suspend data service and allow the purchasing additional data.

Next, as shown in decision Box 606, the application determines if a predefined data alert value has been set by the user of the wireless device. The application may also determine if a partial or full suspension has been requested via the GUI and/or if additional data has been requested.

If the application concludes in the affirmative, the application may display the data alert value, data suspension request and/or data purchase request on the GUI as shown in Box 608. If the application determines that none of the above-mentioned items have been set or requested, the decision process returns to Box 604.

Next, the application determines whether data usage over the predetermined time exceeds a predefined data alert value as shown in Box 610. If the application concludes in the affirmative, the application transmits an alert to the wireless device as shown in Box 612 showing the percentage of data remaining/used and the remaining days in the predetermined time. If the application concludes in the negative, the process is returned to Box 608.

In Box 614, the application determines whether the values set for either a partial or full suspension via the GUI or wireless carrier have been exceeded after the data threshold alert has been sent. The partial suspension is intended to suspend any data requests that exceed a particular data value, e.g., greater than 250 MB. The purpose of this is to permit requests using less data such as email, while restricting requests using more data such as streaming videos. The full suspension criterion input via the GUI or provided by the wireless carrier is intended to suspend all data requests immediately after receiving an alert, or at a specific time thereafter. This is helpful to ensure an individual user or one managing a family account does not exceed their data usage during the predetermined period. If the application concludes that these criteria have not been met, the process returns to Box 608. Otherwise, the process ends at Box 616.

Decision Box 614 also determines whether the data purchase criteria has been met. Namely, the criterion determines if the user's credit/debit card or other form of payment, e.g., data card from store, are valid. If the criterion has been met, the process moves to Box 616. On the other hand, if the application concludes in the negative, the process returns to Box 608.

Alternatively, if the process concludes in the negative, and before returning to Box 608, the application may display a message informing the user that the service account does not have adequate funds to complete the requested update. In yet another alternative aspect, if the process concludes in the negative, the application may prompt the user to add more funds to the service plan. Regarding adding funds, the user may use a credit card, debit card or PayPal information. Alternatively, the user may have a transaction code for minutes that were purchased from a store or online. This may be the case when the user does not have a credit/debit card or PayPal account, or wishes not to provide such information to the application.

In an exemplary aspect, the memory element of the system may include but is not limited to a memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, SIM, UICC, cloud-based memory, or the like.

The code of the service plan application is configured to perform the steps of: (i) displaying a graphical user interface on a wireless device for tracking and managing data usage over predetermined time; (ii) receiving a request via the graphical user interface for the wireless carrier to set an alert when the data usage exceeds a predefined value over the predetermined time; (iii) determining whether the data usage exceeds the predefined value over the predetermined time; and (iv) transmitting the alert to the wireless device when the data usage exceeds the predefined data value over the predetermined time. Other steps as described herein are also contemplated as well as others within the scope and spirit of the invention.

In a further aspect, the system also includes a processor. The processor may be operatively coupled to the memory, e.g., data storage unit. In an exemplary aspect, the processor may execute the service plan application stored on the memory. The processor 114 may be a central processing unit configured to execute instructions including instructions related to software programs. The processor may be configured to process call functions, data transfer, and the like and provide other services to the user.

In another aspect, the processor may be implemented in any type of mobile smartphone that may be operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

In yet a further aspect of the invention, there is disclosed in this application is a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The non-transitory computer-readable or processor-readable medium includes instructions stored thereon for a software program. In an exemplary aspect, the code or instruction of the software program is executable by a processor of the SIM or electronic device in machine readable form. The code of the service plan application is configured to perform the steps of: (i) displaying a graphical user interface on a wireless device for tracking and managing data usage over predetermined time; (ii) receiving a request via the graphical user interface to set an alert when the data usage exceeds a predefined value over the predetermined time; (iii) determining whether the data usage exceeds the predefined value over the predetermined time; and (iv) transmitting the alert to the wireless device when the data usage exceeds the predefined data value over the predetermined time.

In one or more aspects, the actions and/or events of a method, algorithm or module may reside as one or any combination or set of codes and/or instructions on a computer readable medium or machine readable medium, which may be incorporated into a computer program product. Computer readable storage media includes, but is not limited to, RAM, SIM, UICC, cloud-based memory, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device.

The application may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), 4G-LTE, 5G, EV-DO, Wireless Fidelity (Wi-Fi), Bluetooth, and/or the like, and/or a combination of two or more thereof.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A non-transitory computer readable storage medium storing computer-readable instructions executed on a processor of a wireless device configured to manage wireless service on the wireless device comprising:

instructions for tracking wireless service usage with an application executed by the processor in the wireless device for managing wireless service usage to determine an available wireless service amount;

instructions for setting an alert to indicate when the wireless service usage exceeds a predefined value during a predetermined period by receiving the predefined value by input to a graphical user interface generated by the application executed by the processor in the wireless device for managing wireless service usage;

instructions for determining whether the wireless service usage exceeds the predefined value during the predetermined period;

instructions for generating the alert by the processor of the wireless device when the wireless service usage exceeds the predefined value to at least one of the wireless device and a wireless carrier;

instructions for determining an amount of wireless service remaining for the wireless device for the predetermined period;

instructions for determining a rate of wireless service usage per day by the wireless device based on past usage of the wireless data;

instructions for forecasting how many days until the wireless service usage will be depleted based on the remaining amount of wireless data and a rate of wireless data usage per day by the wireless device;

instructions for displaying on the display of the wireless device how many days until the wireless service usage will be depleted based on a forecast determined by the instructions for forecasting;

instructions for determining when there is no more available wireless service amount remaining for the wireless device for the predetermined period;

instructions for blocking a request to utilize wireless service for the wireless device when there is no more available wireless service amount;

instructions for generating a graphical user interface by the application executed by the processor in the wireless device allowing the user to purchase additional wireless service;

instructions for receiving a request via a graphical user interface to purchase additional wireless service;

instructions for implementing the purchase of additional wireless service through the graphical user interface generated by the application executed by the processor in the wireless device;

instructions for updating by the application executed by the processor in the wireless device the wireless device and the wireless carrier with information regarding the purchase of additional wireless service to update available wireless service amounts;

instructions for transmitting a message to a wireless carrier to indicate an implementation status of the application executed by the processor in the wireless device for managing wireless service usage and controlling wireless service by the wireless carrier based on the implementation status provided in the message received by the wireless carrier;

instructions for displaying a graphical user interface on the wireless device for managing wireless service usage;

instructions for receiving an input into the graphical user interface from the user of a threshold amount of wireless data subject to a data request suspension; and instructions for blocking a request to utilize wireless data for the wireless device when the wireless usage exceeds the threshold amount of wireless data subject to the data request suspension, wherein the wireless service comprises at least one of wireless data service, wireless voice service, and wireless text message service.

2. The non-transitory computer readable storage medium according to claim 1, further comprising:
instructions for displaying a graphical user interface on the wireless device for managing wireless service usage;
instructions for receiving a request via the graphical user interface to set the alert when the wireless service usage is forecasted to exceed the predefined value during a predetermined period;
instructions for forecasting whether the wireless data usage will exceed the predefined value during the predetermined period based on the remaining amount of wireless data and a rate of wireless data usage per day by the wireless device; and
instructions for generating the alert when a forecasted wireless data usage will exceed the predefined value during the predetermined period based on the remaining amount of wireless data and the rate of wireless data usage per day by the wireless device.

3. The non-transitory computer readable storage medium according to claim 1, further comprising:
instructions for displaying a graphical user interface on the wireless device for managing wireless service usage;
instructions for receiving an input into the graphical user interface from the user of a threshold amount of wireless data subject to a data request suspension; and
instructions for sending a query to the wireless device whether to allow a data request when the data request exceeds the threshold amount of wireless data subject to the data request suspension.

4. The non-transitory computer readable storage medium according to claim 1, further comprising:
instructions for receiving an input to the graphical user interface setting an alert for a predefined number of days until wireless data service is depleted; and
instructions for displaying on the wireless device the alert when a remaining number of days before all data is forecasted to be depleted based on an average of data usage per day.

5. The non-transitory computer readable storage medium according to claim 1, further comprising:
instructions for displaying a graphical user interface on the wireless device for managing wireless service usage; and
instructions for receiving a request via a graphical user interface to set a second alert with a second predefined value greater than the predefined value.

6. The non-transitory computer readable storage medium according to claim 1, further comprising instructions for forecasting how many days until the wireless service usage will be depleted based on the remaining amount of wireless data and a rate of wireless data usage per day by the wireless device.

7. A wireless service management process for a wireless device comprising:
tracking wireless service usage with an application executed by a processor in the wireless device for managing wireless service usage to determine an available wireless service amount;
setting an alert to indicate when the wireless service usage exceeds a predefined value during a predetermined period by receiving the predefined value by input to a graphical user interface generated by the application executed by the processor in the wireless device for managing wireless service usage;
determining whether the wireless service usage exceeds the predefined value during the predetermined period by the application executed by the processor in the wireless device for managing wireless service usage;
generating the alert by the processor of the wireless device when the wireless service usage exceeds the predefined value to at least one of the wireless device and a wireless carrier;
determining an amount of wireless service remaining for the wireless device for a predetermined period with the application executed by the processor in the wireless device for managing wireless service usage;
determining a rate of wireless service usage per day by the wireless device based on past usage of wireless data with the application executed by the processor in the wireless device for managing wireless service usage;
forecasting how many days until the wireless service usage will be depleted based on the remaining amount of wireless data and a rate of wireless data usage per day by the wireless device with the application executed by the processor in the wireless device for managing wireless service usage;
displaying on the display of the wireless device how many days until the wireless service usage will be depleted by the application executed by the processor in the wireless device for managing wireless service usage based on a forecast determined by the forecasting;
determining when there is no more available wireless service remaining for the wireless device for the predetermined period with the application executed by the processor in the wireless device for managing wireless service usage;
blocking a request to utilize wireless service for the wireless device when there is no more available wireless service amount with the application executed by the processor in the wireless device for managing wireless service usage;
generating a graphical user interface by the application executed by the processor in the wireless device allowing the user to purchase additional wireless service;
receiving a request via the graphical user interface to purchase additional wireless service;
implementing a purchase of additional wireless service through the graphical user interface generated by the application executed by the processor in the wireless device;
updating the wireless device by the application executed by the processor in the wireless device and the wireless carrier with information regarding the purchase of additional wireless service to update the available wireless service amount; and
transmitting a message to a wireless carrier to indicate an implementation status of the application executed by the processor in the wireless device for managing wireless service usage and controlling wireless service by the wireless carrier based on the implementation status provided in the message received by the wireless carrier,
wherein the wireless service usage is measured over the predetermined period selected from service days and days in a month as provided by the wireless carrier; and wherein the wireless service comprises at least one of wireless data service, wireless voice service, and wireless text message service.

8. The wireless service management process for a wireless device according to claim 7
wherein the graphical user interface displays airtime usage management controls; and
wherein the graphical user interface displays a percentage of number of days remaining in the predetermined period and a percentage of data remaining in the predetermined period.

9. The wireless service management process for a wireless device according to claim 7, further comprising:
displaying a graphical user interface on the wireless device for managing wireless service usage;
receiving a request via the graphical user interface to set the alert when the wireless service usage is forecasted to exceed the predefined value during the predetermined period;
forecasting whether the wireless data usage will exceed the predefined value during the predetermined period based on the remaining amount of wireless data and the rate of wireless data usage per day by the wireless device; and
generating the alert when a forecasted wireless data usage will exceed the predefined value during the predetermined period based on the remaining amount of wireless data and the rate of wireless data usage per day by the wireless device.

10. The wireless service management process for a wireless device according to claim 7, further comprising:
displaying a graphical user interface on the wireless device for managing wireless service usage;
receiving an input into the graphical user interface from the user of a threshold amount of wireless data subject to a data request suspension; and
sending a query to the wireless device whether to allow a data request when a data request exceeds the threshold amount of wireless data subject to the data request suspension.

11. The wireless service management process for a wireless device according to claim 7, further comprising:
displaying a graphical user interface on the wireless device for managing wireless service usage;
receiving an input into the graphical user interface from the user of a threshold amount of wireless data subject to a data request suspension; and
blocking a request to utilize wireless data for the wireless device when the wireless usage exceeds the threshold amount of wireless data subject to the data request suspension,
wherein the wireless service comprises at least one of wireless data service, wireless voice service, and wireless text message service.

12. The wireless service management process for a wireless device according to claim 7, further comprising:
receiving an input to the graphical user interface setting an alert for a predefined number of days until wireless data service is depleted; and
displaying on the wireless device the alert when a remaining number of days before all data is forecasted to be depleted based on an average of data usage per day.

13. The wireless service management process for a wireless device according to claim 7, further comprising:
displaying a graphical user interface on the wireless device for managing wireless service usage; and receiving a request via a graphical user interface to set a second alert with a second predefined value greater than the predefined value.

14. The wireless service management process for a wireless device according to claim 7 further comprising controlling wireless service by the wireless carrier based on the implementation status provided in the message received by the wireless carrier.

15. A wireless device configured to manage wireless service usage comprising:
a wireless device processor configured to implement an application for managing wireless service usage to track wireless service usage to determine an available wireless service amount and to manage wireless service usage;
the wireless device processor further configured to set an alert to indicate when the wireless service usage exceeds a predefined value during a predetermined period by receiving the predefined value by input to a graphical user interface generated by the application executed by the processor in the wireless device for managing wireless service usage;
the wireless device processor further configured to determine whether the wireless service usage exceeds the predefined value during the predetermined period;
the wireless device processor further configured to generate the alert when the wireless service usage exceeds the predefined value to at least one of the wireless device and a wireless carrier;
the wireless device processor further configured to determine an amount of wireless service remaining for the wireless device for a predetermined period with the application for managing wireless service usage;
the wireless device processor further configured to forecast how many days until the wireless service usage will be depleted based on the remaining amount of wireless data and a rate of wireless data usage per day by the wireless device with the application for managing wireless service usage;
the wireless device processor further configured to display on a wireless device display how many days until the wireless data usage will be depleted based on a forecast by the wireless device processor;
the wireless device processor further configured to determine when there is no more available wireless service remaining for the wireless device for the predetermined period with the application executed by the processor in the wireless device for managing wireless service usage;
the wireless device processor further configured to block a request to utilize wireless service for the wireless device when there is no more available wireless service amount;
the wireless device processor is further configured to generate a graphical user interface on the wireless device with the application for managing wireless service usage allowing the user to purchase additional wireless service;
the wireless device processor is further configured to receive a request via the graphical user interface with the application for managing wireless service usage to purchase the additional wireless service;
the wireless device processor is further configured to implement the purchase of additional wireless service with the application for managing wireless service usage through the graphical user interface generated by the wireless device processor in the wireless device; and the wireless device processor is further configured to update the wireless device and the wireless carrier with information regarding the purchase of additional wireless service to update the available wireless service amount, wherein the wireless service comprises at least one of wireless data service, wireless voice service, and wireless text message service;

wherein the wireless device processor is further configured to transmit periodically via a transceiver a message to a wireless carrier to indicate an implementation status of the application executed by the processor in the wireless device for managing wireless service usage and controlling wireless service by the wireless carrier based on the implementation status provided in the message received by the wireless carrier;

wherein the wireless device processor is further configured to generate a graphical user interface on the wireless device for managing wireless service usage;

wherein the wireless device processor is further configured to receive an input into the graphical user interface from the user of a threshold amount of wireless data subject to a data request suspension; and wherein the wireless device processor is further configured to block a request for wireless usage when the wireless usage exceeds the threshold amount of wireless data subject to the data request suspension.

16. The wireless device according to claim 15, wherein the wireless device processor is further configured to display a graphical user interface on the wireless device for managing wireless service usage;

the wireless device processor is further configured to receive a request via the graphical user interface to set the alert when the wireless service usage is forecasted to exceed the predefined value during a predetermined;

the wireless device processor is further configured to forecast whether the wireless data usage will exceed the predefined value during the predetermined period based on the remaining amount of wireless data and the rate of wireless data usage per day by the wireless device; and the wireless device processor is further configured to generate the alert when a forecasted wireless data usage will exceed the predefined value during the predetermined period based on the remaining amount of wireless data and the rate of wireless data usage per day by the wireless device.

17. The wireless device according to claim 15, wherein the wireless device processor is further configured to generate a graphical user interface on the wireless device for managing wireless service usage;

wherein the wireless device processor is further configured to receive an input into the graphical user interface from the user of a threshold amount of wireless data subject to a data request suspension; and wherein the wireless device processor is further configured to send a query to the wireless device whether to allow a data request when the data request exceeds a predetermined amount.

18. The wireless device according to claim 15, wherein the wireless device processor is configured to receive an input to the graphical user interface setting an alert for a predefined number of days until wireless data service is depleted; and wherein the wireless device processor is further configured to control a display on the wireless device to display a forecasted remaining number of days before all data is depleted based on an average of data usage per day.

19. The wireless device according to claim 15, wherein the wireless device processor is further configured to generate a graphical user interface on the wireless device for managing wireless service usage; and wherein the wireless device processor is further configured to receive a request via a graphical user interface to set a second alert with a second predefined value greater than the predefined value.

20. The wireless device according to claim 15, wherein the wireless device processor further configured to determine a rate of wireless service usage per day by the wireless device based on past usage of wireless data with the application for managing wireless service usage.

* * * * *